United States Patent [19]

MacLean et al.

[11] 4,125,232
[45] Nov. 14, 1978

[54] VERTICAL TAKE-OFF AND LANDING (VTOL) AIRCRAFT WITH FIXED HORIZONTAL VARIABLE-PITCHED ROTORS

[76] Inventors: Ewen M. MacLean, c/o George Spector, 3615 Woolworth Bldg., 233 Broadway; George Spector, 3615 Woolworth Bldg., 233 Broadway, both of, New York, N.Y. 10007

[21] Appl. No.: 738,021

[22] Filed: Nov. 2, 1976

[51] Int. Cl.² .............................................. B64C 29/00
[52] U.S. Cl. .................................................... 244/12.3
[58] Field of Search ................. 244/12.3, 23 B, 6, 214, 244/23 A; D12/79

[56] References Cited

U.S. PATENT DOCUMENTS

| | | | |
|---|---|---|---|
| 1,988,919 | 1/1935 | Santarsiero | 244/6 |
| 2,753,132 | 7/1956 | Gley | 244/6 |
| 2,899,142 | 8/1959 | Breguet | 244/12.3 |
| 2,988,301 | 6/1961 | Fletcher | 244/12.3 |
| 3,120,362 | 2/1964 | Curtis et al. | 244/12.3 |
| 3,618,875 | 11/1971 | Kappus | 244/12.3 |

FOREIGN PATENT DOCUMENTS

| | | | |
|---|---|---|---|
| 1,179,809 | 10/1964 | Fed. Rep. of Germany | 244/214 |
| 1,506,086 | 11/1974 | Fed. Rep. of Germany | 244/12.3 |
| 1,102,527 | 2/1968 | United Kingdom | 244/12.3 |

*Primary Examiner*—Galen L. Barefoot

[57] ABSTRACT

A small jet aircraft having pitched horizontal rotor blades so to provide a vertical lift for the craft and eliminate need of a runway, the craft including conventional jet engine for horizontal flight, the rotor blades being located within openings formed through the wings.

2 Claims, 6 Drawing Figures

U.S. Patent  Nov. 14, 1978  4,125,232
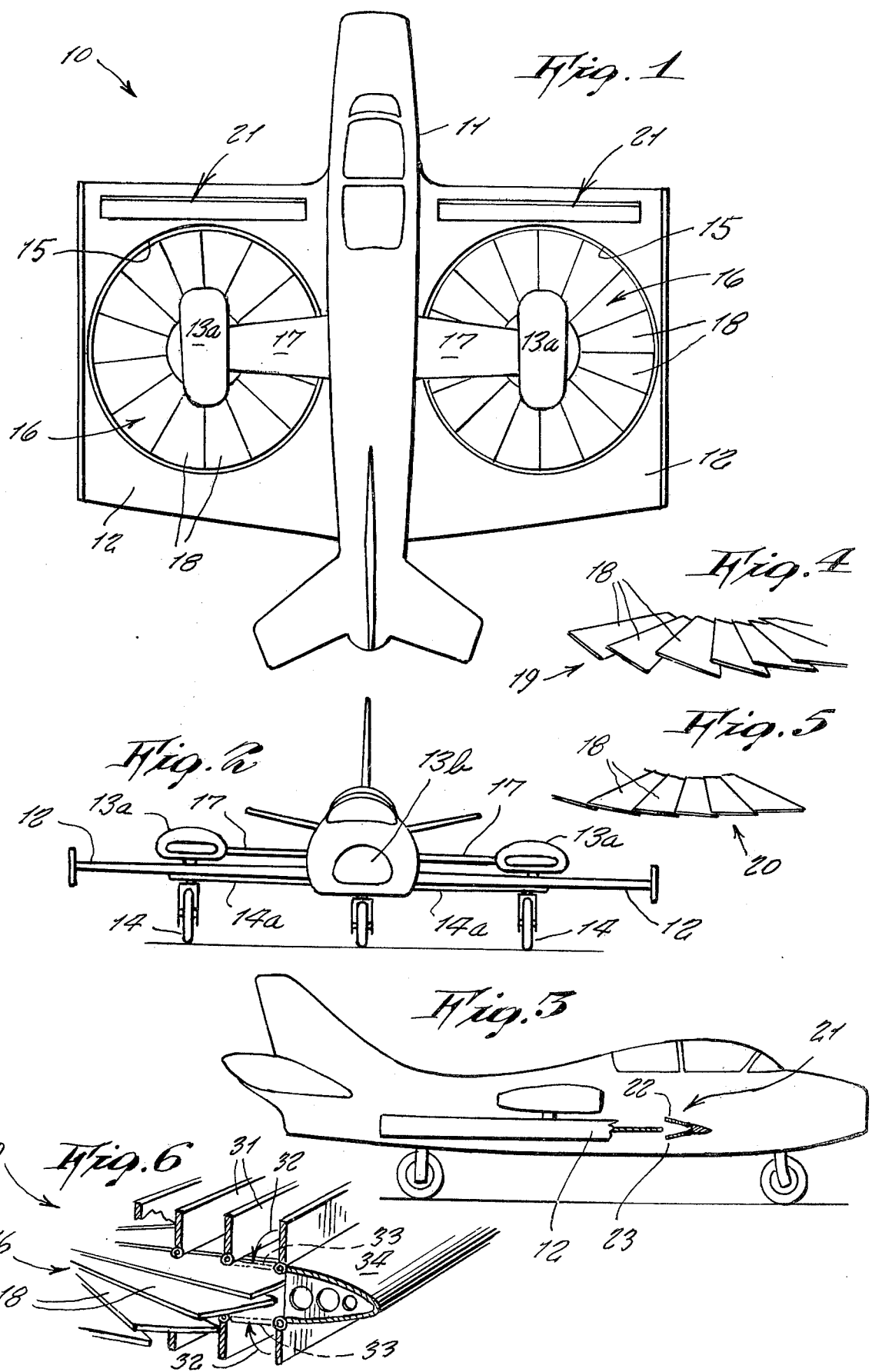

VERTICAL TAKE-OFF AND LANDING (VTOL) AIRCRAFT WITH FIXED HORIZONTAL VARIABLE-PITCHED ROTORS

This invention relates generally to jet airplanes.

A principal object of the present invention is to provide a small conventional jet aircraft in which there is additionally incorporated pitched horizontal rotor blades within each wing, the rotor blades of the present invention furnishing a vertical thrust for the craft.

Another object is to provide an aircraft which accordingly allows vertical take-off and landing so that it does not require an airport runway.

Another object is to provide a vertical take-off and landing aircraft (VTOL) in which pitched horizontal rotor blades can be neutralized when the craft has climbed vertically to a flying altitude and then commences with horizontal flight; this procedure being reversed when landing.

Other objects are to provide a vertical take-off and landing (VTOL) aircraft with fixed horizontal variable-pitched rotors which is simple in design, inexpensive to manufacture, rugged in construction, easy to use and efficient in operation.

These and other objects will be readily evident upon a study of the following specification and the accompanying drawing wherein:

FIG. 1 is a top view of a jet airplane shown incorporating the present invention.

FIG. 2 is a front view thereof.

FIG. 3 is a side view shown with wing partly broken away so to illustrate adjustable ailerons on a forward portion of the wing so to remove stress on the rotor blades when pitched during horizontal flight.

FIG. 4 shows the rotor blades in pitched position.

FIG. 5 shows the rotor blades neutralized during idling on horizontal travel.

FIG. 6 is a detail showing a modified design to overcome the stress on the rotor blades during horizontal flight, and consists of louvers, above and below the rotor blades, and which are open during a vertical ascent or descent and which close during horizontal travel so to take the load off the rotor blades.

Referring now to the drawing in greater detail, the reference numeral 10 represents a vertical take-off and landing aircraft according to the present invention wherein there is a fuselage 11 having wings 12 on each side; the craft including conventional piston engines 13a and jet engine 13b as well as landing wheels 14 retractable into wheel housings 14a.

In the present invention, each wing 12 has a circular opening 15 vertically through a mid-portion thereof, and a rotor 16 is located in this opening.

In the drawing an example of the invention is illustrated which is incorporated into a military aircraft with a crew of two. The craft includes two piston engines 13a for vertical lift and one jet engine 13b for horizontal flight. The approximate fuselage length is 40 feet and the wing span 36 feet. A piston engine is shown located over a center of the rotor and is supported on a strut 17 extending from a side of the fuselage. The present invention is, of course, adaptable for other designs of craft as well.

The rotors rotate in opposite directions to each other and are each independently controlled as well as independently powered. Each rotor has a plurality of radially extending vanes or blades 18 that are each pivotable along a radially extending axis through the rotor hub so to assume varied pitched or neutral positions as shown at 19 and 20 respectively in FIGS. 4 and 5.

In operative use, the craft can take off vertically by use of the rotors, and after attaining a cruising altitude, the pitched horizontal rotor blades are neutralized when the craft commences horizontal flight.

In order to prevent a stress on the rotor blades 18 during a forwardly horizontal flight, the craft includes an aileron 21 along a forward edge of each wing so to shield the rotor blades from the air ahead of the craft as the wings move forwardly therethrough. The ailerons include rearwardly diverging upper and lower fins 22 and 23 pivotally hinged to upper and lower surfaces of the wing, and are individually controllable in pitch.

In a modified design 30 shown on FIG. 6, stress against the rotor blades 18 by air from forward is eliminated by controlled louvers 31 on an upper and lower surfaces of the wing, and which when in the position shown, allow the rotors to function for vertical thrust. However, during commencement of horizontal flight the louvers are pivoted, as shown by arrows 32, so the louvers form a continuous streamlined surfaces 33 flush with the wing surfaces 34 as indicated by the dotted lines. Thus they contribute to the aerodynamic surfaces of the wings during forward flight. This may be in some instances a preferred construction than the ailerons 21, particularly if they become critical with the airflow over the aerodynamic surfaces of the wings. The louvers thus enclose the rotor therebetween inside the wing.

Thus different designs are presented.

While various changes may be made in the detail construction, it is understood that such changes will be within the spirit and scope of the present invention as is defined by the appended claims.

What is claimed is:

1. In a vertical take-off and landing aircraft, the combination of a jet airplane including a fuselage and sideward wings, a turbojet engine for horizontal flight, a circular opening vertically through a midportion of each said wing, a rotor assembly positioned in each said opening being rotatable about a generally vertical axis, each said rotor being individually controlled and powered by an engine, including transverse struts supporting said engines axially above said rotors, said struts extending laterally from opposite sides of said fuselage parallel to and spaced above said wings, each said rotor including a plurality of radially extending blades pivotally controlled about a radially extending axis from a hub of said rotor, and means being provided to prevent stress of said blades from air during forward flight, said rotor blades providing vertical thrust during takeoff or landing of said airplane, wherein said means comprise transverse similar ailerons mounted along forward edges of each wing, said ailerons including upper and lower fins pivotally controlled about hinges along their forward edges hinged to upper and lower surfaces of said wing, said ailerons being of such length so as to deflect air from contact with the entire rotor assembly having a closed streamlined front edge diverging rearwardly to align with upper and lower surfaces of the wings.

2. The combination as set forth in claim 1 wherein said means further comprises adjustably controlled louvers above and below said rotor, said louvers in closed position forming a continuation of said upper and lower surfaces of said wing, thereby completely enclosing and sealing the rotors within said wings, said louvers being movable outwardly of said upper and lower surfaces to open positions.

* * * * *